Patented Jan. 4, 1944

2,338,683

UNITED STATES PATENT OFFICE 2,338,683

UNSATURATED ESTERS OF ARYLOXY ALCOHOLS

Gerald H. Coleman and Bartholdt C. Hadler, Midland, Mich., assignors to The Dow Chemical Company, Midland, Mich., a corporation of Michigan No Drawing. Application December 24, 1940, Serial No. 371,592

7 Claims. (Cl. 260—486)

This invention concerns esters of aryloxy-substituted lower alcohols with certain unsaturated aliphatic monocarboxylic acids, said esters having the general formula

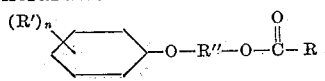

wherein R' represents an alkyl, cycloalkyl, alkoxy, aryl, or halogen substituent, R" represents a lower alkylene radical containing from two to six carbon atoms, R represents an unsaturated aliphatic hydrocarbon radical containing not more than ten carbon atoms and at least one ethylenic linkage, n represents the number of substituents on the aryl nucleus and is usually not greater than 2, but may be as high as 4 when the substituent is halogen. All such esters are high-boiling liquids or crystalline solids which are substantially insoluble in water, but are readily soluble in organic solvents. The compounds, especially those containing an alkyl substituent having at least 2 carbon atoms, are useful as plasticizing or modifying agents for vinyl resins, e. g. polystyrene, and cellulose derivative (e. g. ethyl cellulose, cellulose acetate, etc.) compositions.

The unsaturated esters of the present class are conveniently prepared by esterifying an aryloxy alcohol, e. g. beta-(2-xenoxy)-ethanol, beta-(tertiarybutyl-phenoxy)-ethanol, beta-(2-chlorophenoxy)-propanol, beta-(2-chloro-phenoxy)-ethanol, etc. with an aliphatic mono-carboxylic acid which contains not more than ten carbon atoms and at least one ethylenic linkage in the aliphatic residue, e. g. crotonic acid, acrylic acid, beta-ethyl-acrylic acid, undecylenic acid, sorbic acid, etc. The reaction may be carried out by heating at a temperature of approximately 60°–130° C. a mixture of the aryloxy alcohol with approximately one chemical equivalent of the unsaturated mono-carboxylic acid, together with a small proportion of an esterification catalyst, e. g. approximately 0.01–0.04 molecular equivalent of a strong acid, such as sulphuric or benzene sulphonic acid. Water is formed in the reaction and, if desired, a water-immiscible organic solvent, such as benzene or toluene, may be added to the reaction mixture for the purpose of promoting distillation and removal of the water during the esterification. Upon completion of the reaction, the mixture is treated with sufficient alkali to neutralize any free acid, washed with water, and the ester product is separated and purified by fractional distillation or crystallization.

The following examples are illustrative of the preparation of several of the esters of the present class but are not to be construed as limiting the invention:

Example 1

A mixture of 214 grams (1 mol) of beta-(2-xenoxy)-ethanol, 86 grams (1 mol) of crotonic acid, and 5 grams of benzene sulphonic acid was heated at a temperature of 90°–120° C. for 7½ hours in a flask fitted with a dropping funnel, condenser, and receiver arranged in such a manner as to permit distillation of water from the mixture. During the heating, benzene was added slowly to facilitate the distillation of water. Upon completion of the reaction, the mixture was allowed to cool, dissolved in benzene, and washed with dilute aqueous sodium bicarbonate solution. The benzene was then distilled off and the ester product was purified by fractional distillation under vacuum. There was obtained beta-(2-xenoxy)-ethyl crotonate, a colorless mobile liquid distilling at approximately 200°–202° C. under 4 millimeters pressure and having a specific gravity of about 1.117 at 20/4° C. and the formula

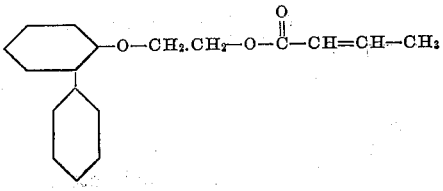

Example 2

A mixture of 194 grams (1 mol) of beta-(4-tertiary-butyl-phenoxy)-ethanol, 86 grams (1 mol) of crotonic acid, and 5 grams of benzene sulphonic acid was heated at a temperature of 100°–120° C. for 5 hours and the ester product was separated as in Example 1. There was obtained beta-(4-tertiarybutyl-phenoxy)-ethyl crotonate, a colorless liquid distilling at approximately 180°–182° C. under 5 millimeters pressure and having a specific gravity of about 1.022 at 20/4° C. and the formula

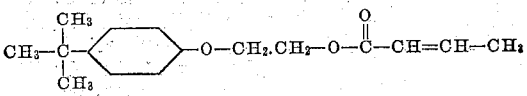

Example 3

A mixture of 128 grams (0.76 mol) of beta-(2-methoxy-phenoxy)-ethanol, 64.5 grams (0.75 mol) of crotonic acid, and 5 grams of benzene sulphonic acid was heated at a temperature of approximately 86°–91° C. for 5 hours and the ester product was separated as in Example 1. There was obtained beta-(2-methoxy-phenoxy)-ethyl crotonate, a colorless liquid distilling at approximately 135°–138° C. under 1 millimeter pressure and having a specific gravity of about 1.1234 at 25/4° C. and the formula

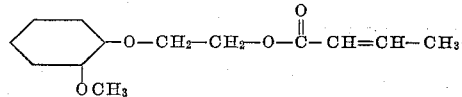

*Example 4*

A mixture of 88 grams (0.51 mol) of beta-(2-chloro-phenoxy)-ethanol, 43 grams (0.50 mol) of methacrylic acid, 5 grams of benzene sulphonic acid, and 1 gram of 4-cyclohexyl-phenol was heated at a temperature of approximately 80°–88° C. for 2½ hours and the ester product was separated as in Example 1. The 4-cyclohexyl-phenol was employed for the purpose of inhibiting polymerization. There was obtained beta-(2-chloro-phenoxy)-ethyl methacrylate, a white crystalline solid distilling at approximately 115°–118° C. under 1 millimeter pressure, melting at approximately 32.5°–34° C., and having the formula

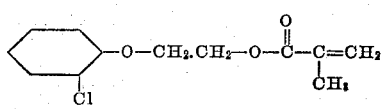

*Example 5*

A mixture of 31 grams (0.14 mol) of (2-xenoxy)-propanols, 11.5 grams (0.13 mol) of crotonic acid, and 5 grams of benzene sulphonic acid was heated at a temperature of approximately 83°–95° C. for 5½ hours and the ester product was separated as in Example 1, whereby there was obtained (2-xenoxy)-propyl crotonate, a liquid distilling at approximately 165°–167° C. under 1 millimeter pressure, having a specific gravity of about 1.094 at 25/25° C. and the formula

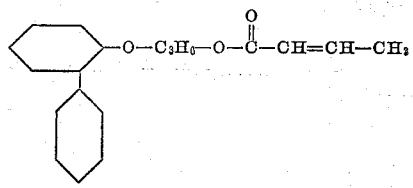

Other unsaturated aryloxy-alkyl esters of the present class may be prepared by the general method illustrated by the foregoing examples. For example, gamma-(2.4-dichloro-phenoxy)-propanol may be reacted with acrylic acid to produce gamma-(2.4-dichloro-phenoxy)-propyl acrylate; beta-(3.5-dimethyl-phenoxy)-ethanol with methacrylic acid to produce beta-(3.5-dimethyl-phenoxy)-ethyl methacrylate; gamma-(4-xenoxy)-propanol with vinylacetic acid to produce gamma-(4-xenoxy)-propyl vinylacetate; beta-(2.4.5.6-tetrachloro-phenoxy)-ethanol with crotonic acid to produce beta-(2.4.5.6-tetrachloro-phenoxy)-ethyl crotonate; beta-(2-cyclohexyl-phenoxy)-ethanol with tiglic acid to produce beta-(2-cyclo-hexyl-phenoxy)-ethyl tiglate; beta-(2-bromo-phenoxy)-butanol with beta-ethylacrylic acid to produce beta-(2-bromo-phenoxy)-butyl beta-ethylacrylate; beta-(4-tertiaryoctyl-phenoxy)-ethanol with geranic acid to produce beta-(4-tertiaryoctyl-phenoxy)-ethyl geranate; beta-(2-methyl-phenoxy)-ethanol with furoic acid to produce beta-(2-methyl-phenoxy)-ethyl furoate; etc.

This application is a continuation-in-part of our copending application Serial No. 321,314, filed February 28, 1940, which, in turn, is a continuation-in-part of application Serial No. 177,655, filed December 1, 1937.

We claim:

1. An ester of an aryloxy-substituted lower alcohol and an unsaturated aliphatic monocarboxylic acid, said ester having the general formula

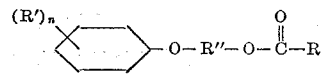

wherein R' represents a mono-valent cyclic hydrocarbon radical having 6 carbon atoms in the ring, R'' represents a lower alkylene radical containing at least two carbon atoms, R represents an aliphatic hydrocarbon radical containing not more than 10 carbon atoms and at least one ethylenic linkage, and n represents an integer not greater than 2.

2. An ester of an aryloxy-substituted lower alcohol and an unsaturated aliphatic monocarboxylic acid, said ester having the general formula

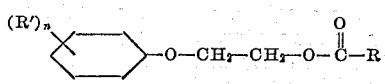

wherein R' represents an aryl radical, R represents an aliphatic hydrocarbon radical containing not more than 10 carbon atoms and at least one ethylenic linkage, and n represents an integer not greater than 2.

3. An ester of an aryloxy-substituted lower alcohol and an unsaturated aliphatic monocarboxylic acid, said ester having the general formula

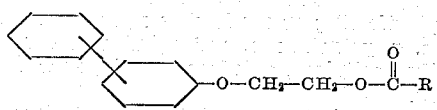

wherein R represents an aliphatic hydrocarbon radical containing not more than 10 carbon atoms and at least one ethylenic linkage.

4. An ester having the general formula:

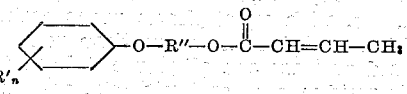

wherein R'' represents a lower alkylene radical containing at least two carbon atoms, R' represents a mono-valent cyclic hydrocarbon radical having 6 carbon atoms in the ring and n represents an integer not greater than 2.

5. An ester having the general formula:

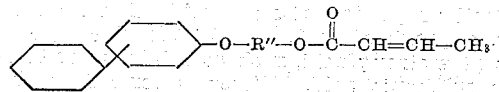

wherein R'' represents a lower alkylene radical containing at least two carbon atoms.

6. A beta-xenoxy-ethyl crotonate.

7. Beta-(2-xenoxy)-ethyl crotonate.

GERALD H. COLEMAN.
BARTHOLDT C. HADLER.